United States Patent [19]

Quiroz

[11] 4,324,232
[45] Apr. 13, 1982

[54] SOLAR PANEL, PARTICULARLY FOR FACADES OF BUILDINGS

[76] Inventor: Gabriella Quiroz, Strada Val Pattonera, 187, 10100 Torino, Italy

[21] Appl. No.: 173,187

[22] Filed: Jul. 28, 1980

[30] Foreign Application Priority Data

Jul. 27, 1979 [IT] Italy .............. 68566 A/79

[51] Int. Cl.³ ............................................. F24J 3/02
[52] U.S. Cl. .............................. 126/450; 126/429; 126/449
[58] Field of Search ............ 126/429, 449, 450, 417, 126/441, 444, 445, 448, 451

[56] References Cited

U.S. PATENT DOCUMENTS

| | | | |
|---|---|---|---|
| 4,046,133 | 9/1977 | Cook | 126/429 |
| 4,068,652 | 1/1978 | Worthington | 126/429 |
| 4,072,142 | 2/1978 | Lof | 126/449 |
| 4,108,155 | 8/1978 | Koizumi et al. | 126/429 |
| 4,136,669 | 1/1979 | Lane | 126/450 |
| 4,141,338 | 2/1979 | Lof | 126/449 |
| 4,154,220 | 5/1979 | Loth | 126/450 |
| 4,154,223 | 5/1979 | Lof | 126/450 |
| 4,201,190 | 5/1980 | Bowen | 126/450 |
| 4,219,012 | 8/1980 | Bergen | 126/449 |

Primary Examiner—Daniel J. O'Connor
Attorney, Agent, or Firm—H. Dale Palmatier

[57] ABSTRACT

The solar panel comprises a cavity having disposed therein a slab apt to be lapped by the air which has to be heated, the said cavity being provided with a perforation for the inlet and a perforation for the outlet of the said air into and from the said cavity, and is characterized in comprising a second and a third cavity, each of which communicates with the said first cavity, the said second and third cavities being arranged to form sections of channel for the inlet and the outlet of the air into and from the solar panel.

8 Claims, 5 Drawing Figures

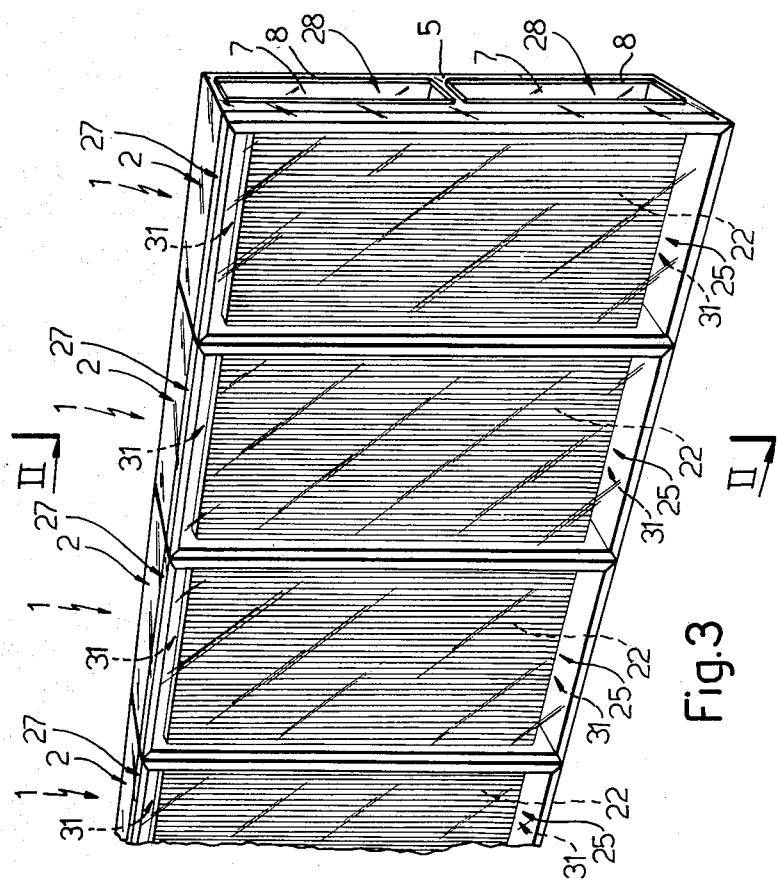
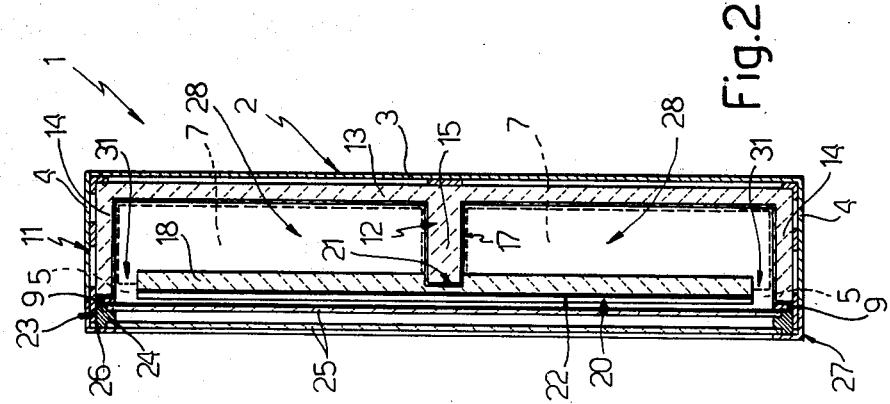

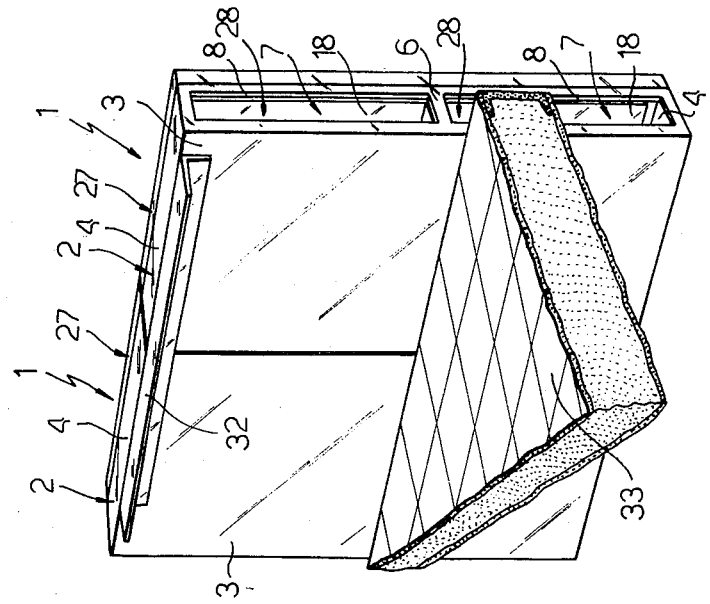
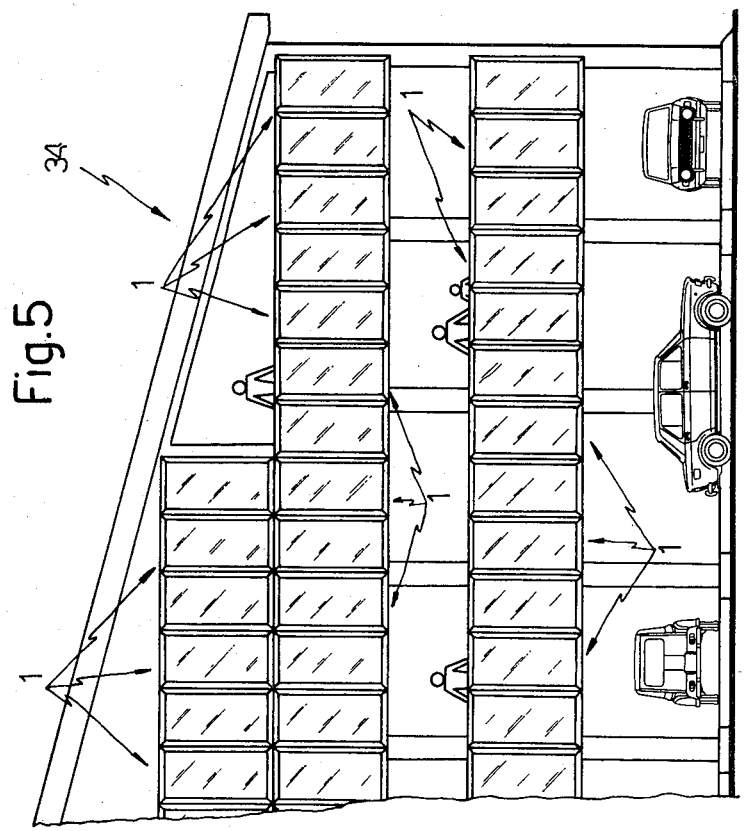

SOLAR PANEL, PARTICULARLY FOR FACADES OF BUILDINGS

BACKGROUND OF THE INVENTION

The present invention relates to solar panel, particularly suitable for the facades of buildings, which may, itself, be part of the said facades and is adapted to heat, to a pre-established temperature, the ambient air of the inner rooms of the buildings.

As is known, for the heating of inner rooms of buildings by means of the solar energy also solar panels of the air-to-air type are used, which are provided with a pair of perforations for the inlet and the outlet of the air utilized in the circuit into which the said solar panels are inserted. Normally, such perforations are coupled with corresponding perforations formed in two channels which, respectively, draw the air at high temperatures (utilization temperatures) and introduce the air at the low temperatures which the air has after having been used.

The said channels are provided with a plurality of perforations adapted to be coupled with corresponding perforations of successive solar panels, thus providing a connection in parallel between the panels by means of the said channels.

For the utilization of the solar panels of the type specified hereinabove a support structure is required for the installation of both the panels and the remaining parts of the plant.

The plants which operate by means of the said panels have some disadvantages.

First of all, the complexity of the plant implies considerable difficulties and a not negligible time for the installation; accordingly, the cost percentage for the installation of the plant is considerable with respect to the total cost of the plant. Furthermore, usually, the facade of the building on which the plant is to be installed must be transformed and reinforced to obtain the support structure which supports the various solar panels and the connection channels of the plant.

In addition, when applying the modalities of connection described hereinabove not all the available space is utilized, because, in view of eventual substitution of parts and maintenance operations it is necessary for adjacent panels to be suitably spaced from each other in order to permit separating each panel from the channels without having to act on the adjacent panels. Thus, the sum of the areas of the surfaces which pick up the solar energy is considerably smaller than the area available for the solar radiation on the facade of the building. It follows that a high number of solar panels and a large area available on the facade (the desired temperature in the inner rooms of the building being equal) are required, or a lower temperature (and hence a lower thermal efficiency) is obtained, owing to the smaller number of solar panels which may be disposed on the facade of the building. Furthermore, as will be explained later, the presence of channels outside the solar panels gives rise to a higher dispersion of heat because of the larger contact area between the plant and the surrounding air, and therefore, to obviate this disadvantage it is necessary to provide a more efficient heat insulation.

SUMMARY OF THE INVENTION

It is an object of the present invention to provide a solar panel of the type described hereinabove, which will be free from the aforementioned disadvantages.

According to the present invention a solar panel is provided, comprising a cavity having disposed therein a slab arranged to be traversed by the air which has to be heated, the said cavity being provided with an air inlet perforation and an air outlet perforation, also a second and a third cavity confronting the whole of the first cavity, each of which communicates with the said first cavity, the said second and third cavity being apt to form channel sections for the inlet and the outlet of the air into and from the solar panel.

BRIEF DESCRIPTION OF THE DRAWINGS

For a better understanding of the present invention an embodiment of the solar panel according to the invention will now be described, by way of non limiting example, with reference to the accompanying drawings, in which:

FIG. 2 is a section along line II—II of FIG. 3, showing the solar panel of FIG. 1;

FIG. 3 is a partial perspective front view of a plurality of solar panels similar to the solar panel of FIG. 1, showing the modalities for the connection of the said panels;

FIG. 4 is a partial perspective rear view of a structure of a building in which some solar panels according to the present invention are utilized; and FIG. 5 is a partial front view showing the modalities for the use of solar panels according to the present invention on a facade of an inhabited building.

DETAILED DESCRIPTION OF THE INVENTION

Figure 1:
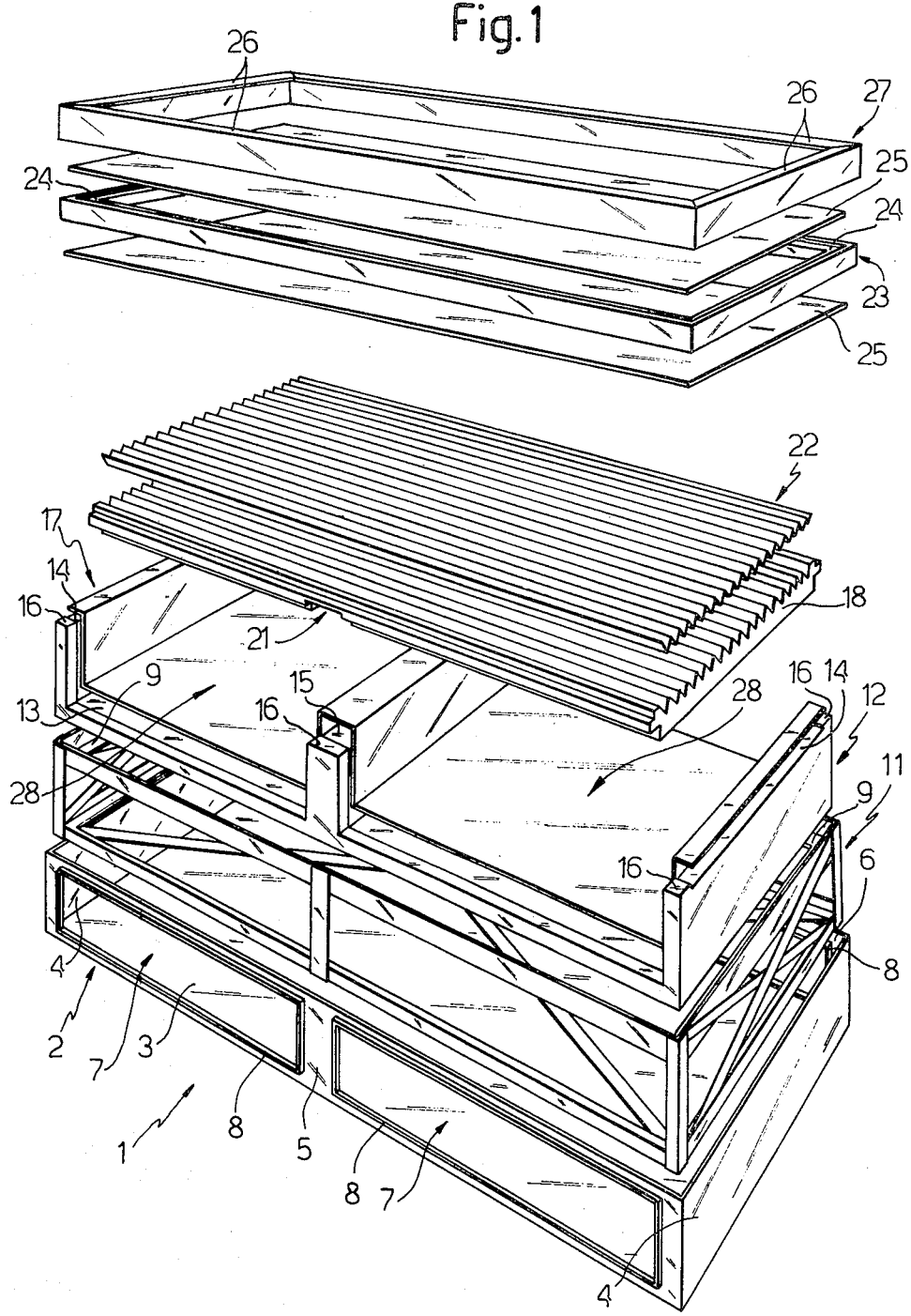
FIG. 1 is an exploded perspective view showing the elements which form the solar panel in accordance with the teachings of the present invention.

Referring now to FIG. 1, reference numeral 1 indicates the solar panel according to the invention, which panel comprises a substantially parallelepiped housing 2 having a bottom wall 3, a first pair of opposite sidewalls 4 and a second pair of opposite sidewalls 5, 6 (FIGS. 1 and 4), which, together with the bottom wall 3, define a substantially parallelepiped cavity. The sidewall 5 is provided with two rectangular perforations 7, along the perimeter of which a folded rim 8 of constant thickness, turned towards the outside of the solar panel 1, is formed.

Sidewall 6 (FIG. 4) also has two rectangular perforations 7, having dimensions larger than those of the first mentioned perforations 7 and whose relief 8 is turned toward the interior of the solar panel 1, so that it is possible to connect two adjacent solar panels 1 by coupling the perforations 7 of the wall 5 of one solar panel 1 with the perforations of the wall 6 of the adjacent solar panel 1.

Conveniently, the housing 2 is made of a low thermal conductivity material, preferably plastics; in this latter case, the density of the material may be chosen in such a way as to have a lower density towards the interior and a higher density in the zone of the surfaces; in this way, a high mechanical strength of the housing is obtained, together with a low coefficient of heat transmission from the inside to the outside of the housing.

Disposed within the said housing is a support frame 11 whose dimensions are slightly smaller than those of the housing 2; this framed is formed by a plurality of sections according to the arrangement shown in FIG. 1; in particular, some of these sections have such a cross-section as to originate an inner perimetral shoulder 9.

The frame 11, made of a metal material, has substantially the function of imparting the necessary mechanical strength to the solar panel and allowing to connect this latter, for example, to a horizontal plane wall 33 located within the building (FIGS. 4 and 5).

Disposed within the frame 11 is a substantially E-shaped insulating body 12 made of an open-celled plastic material.

In fact, this body 12 is formed by a rectangular bottom wall 13, a pair of opposite sidewalls 14 disposed on the smaller sides of the rectangular wall 13, and a central rib 15, substantially parallelepiped in shape, parallel to the sidewalls 14 and having a larger width and a smaller height with respect to these sidewalls.

The central rib 15 and the sidewalls 14 are provided with a pair of low bosses or lands 16 to provide recessed areas or reliefs on the rib 15 and sidewalls 14 for mounting a rigid reinforcing element 17 formed by a sheet of plastic material and having substantially the same configuration as the upper surface of the body 12.

Body 12 may be formed by pouring a suitable plastic material into a cavity of a mold which reproduces the shape of the said body, by means of known forming techniques.

The said solidified plastic material (which may conveniently be polyurethan) has low heat conductivity and mechanical strength; this latter is increased by coupling the body 12 to and element 17 made of a non-open-celled plastic material which, consequently, has a high mechanical strength.

The element 17 may be produced by introducing a sheet of plastic material into a mold which reproduces the desired shape of the element; in the presence of suitable temperatures and pressures the sheet of plastics is made to adhere onto the surface of the mold in order to impart to it the desired configuration.

The body 12 with the element 17 may be joined to the frame 11 by introducing them into the said frame unprovided with the shoulders 9 (FIG. 1) and then connecting these latter to the frame itself.

Naturally, it is possible to directly mold the body 12 within the frame 11.

The solar panel 1 further comprises a rectangular insulating plate 18 made an open-celled plastic material, for example a low heat conductivity polyurethane, which plate has in the central portion of its lower surface a groove 21 adapted to to engage the rib 15 of the body 12.

The upper surface of the plate 15 is corrugated in order to render possible the engagement with an absorber slab 22 made of black material, which is also corrugated.

Slab 22 is made of low heat conductivity material, which may be any non-metal material, adapted to avoid the transmission, by conduction, in the direction of the longitudinal axis of the sheet, of appreciable quantities of heat, and therefore adapted to establish along the said axis, in the manner which will be explained later, a high thermal gradient.

The protection of the solar panel 1 against atmospheric agencies is obtained by means of a rectangular frame 23, made of plastics, which is provided with shoulders 24, and a pair of transparent protection slabs or panels 25, for example of glass, arranged to rest on the said shoulders. The lower transparent slab or panel 25 rests, together with the lower surface of the frame 23, on the upper surface of the shoulder 9 of the frame 11 (FIG. 2).

The upper transparent slab 25 is locked by a shoulder 26 of a second frame 27 of plastics, whose dimensions are larger than those of the frame 23 and which serves as a cover for the housing 2.

As can clearly be seen in FIG. 2, the lower transparent slab 25 is spaced from the absorber slab 22 to originate a first cavity 20 for the passage of the air which has to absorb the heat picked up by the slab 22. Furthermore, the cooperation between the groove 21 of the plate 18 and the rib 15 of the body 12 originates a pair of channels or second and third cavities 28 connected to the cavity 20, by means of a pair of openings 31 serving as inlets and outlets for cavity 20.

The connection between channels 28 of adjacent solar panels is obtained by coupling the perforations of the wall 5 of a solar panel with the perforations of the wall 6 of the adjacent solar panel and inserting a gasket along the outer perimeter of the contact areas of two solar panels.

In case of no folded rims 8 are provided and, consequently, no strict cooperation being obtained between the perforations 7 of two adjacent solar panels (this being a variant of the just described embodiment), the heat sealing is obtained by means of the said gasket. The solar panels 1 may also be mechanically connected to each other by a block 32, for example by means of screws, as shown in FIG. 4 where there is clearly shown the possibility of forming the parapet of a terrace by connecting a plurality of solar panels to each other and to the plane wall 33 of the building.

The operation of the solar panel described hereinabove is as follows. The air, which is made to circulate within the solar panel, enters the lower channel 28 (FIG. 2) and passing through the lower opening 31 traverses the slab 22 whose temperature is rather high owing to the sand slab being exposed to the flow of solar energy acting thereon.

The air, which moves in the direction of the longitudinal axis of the slab 22 from the lower opening 31 towards the upper opening, assumes increasing temperatures because of the amount of heat which it receives along its path; therefore, a certain thermal gradient is established along it in that there are obtained higher temperatures in the region of the upper opening 31 and lower temperatures in the opposite region, as well as a substantially gradual increase of temperature when passing from the latter to the former.

Because of the low coefficient of heat conductivity of the slab 22, the transmission of heat by conduction along the said plate from the region near the upper opening 31 (where the temperature of the air is higher) towards the region of the lower opening 31 is almost negligible; in this way, the temperature of the air coming out from the upper opening 31 may be particularly high and much higher than that which would be obtained if the element which receives the heat from the sunbeams and transmits it to the air (plate 22) had a high coefficient of heat conductivity. The heated air is introduced, through the upper opening 31, into the upper channel 28 which in turn introduces it into the inner rooms of the building 34, directly or by means of heat exchanger.

Thus, the solar panels formed in accordance with the teachings of the present invention permit a rapid assembly of the said solar panels and, accordingly, a relatively lower cost of assembly. Furthermore, the facade of the building 34 may be formed by the said solar panels 1, thus obtaining a reduction of the masonry costs.

The presence of the inner inlet and outlet channels for the air to be heated allows obtaining a smaller dispersion of the heat and, therefore, better thermal efficiency of the plant formed by the solar panels of the present invention.

The combination of a plurality of solar panels obtained in the way described hereinabove, allows to exploit the total area available for the radiation of the solar energy on the facade of the building.

What I claim is:

1. A solar panel comprising a substantially parallelepiped housing having a bottom wall and a transparent cover opposite the bottom wall, an absorber slab and an insulated body in the housing confronting one another and lying parallel with the bottom wall of the housing in order to form a first cavity between the transparent cover and the slab, the first cavity having air inlet and outlet openings, the slab and body also forming second and third cavities disposed side by side under the whole of said first cavity, each of said second and third cavities communicating with said first cavity through one of said openings, and the second and third cavities forming channels for the inlet and outlet of air into and from the solar panel, said absorber slab being traversed by the air crossing through said first cavity, wherein said body is substantially E-shaped and has a bottom wall, two sidewalls, and a central rib parallel with the said two sidewalls and separating said second and third cavities and connecting said slab with said body, wherein the slab has a length slightly smaller than the length of said body so as to define said inlet and openings, wherein said housing comprises two opposite sidewalls perpendicular with said rib and having formed thereon two rectangular perforations communicating with the said second and third cavities, wherein each of the said cavities has a rectangular contour, the perforations of one of the said sidewalls of the housing being adapted to be connected by the perforations of one of the said sidewalls of the housing of an adjacent, solar panel so as to connect the said channels to one another, and sealing means comprising folded rims of the said perforations for connecting adjacent solar panel housings.

2. A solar panel as claimed in claim 1, and a metal frame interposed between the said body and the said housing.

3. A solar panel as claimed in claim 1, wherein the said E-shaped body comprises a support portion made of an open-celled plastic material, and a coating portion made of sheet of plastic material.

4. A solar panel as claimed in claim 1, wherein between the said slab and the said rib of the E-shaped body there is disposed a plate of open-celled plastic material.

5. A solar panel as claimed in claim 4, wherein the said slab is corrugated, and the said plate has a supporting surface, also corrugated, which is adapted to engate the said slab.

6. A solar panel as claimed in claim 1, wherein the said slab is made of a non-metal material.

7. A solar panel as claimed in claim 6, wherein the said material of the said slab has a low thermal conductivity so as to obtain a significant thermal gradient in the said slab, the thermal gradient being in the direction of the flow of the air which.

8. A solar panel as claimed in claim 1, wherein the said housing is made of plastic material.

* * * * *